US010970531B2

(12) United States Patent
Rahul et al.

(10) Patent No.: US 10,970,531 B2
(45) Date of Patent: Apr. 6, 2021

(54) DIGITIZATION OF INDUSTRIAL INSPECTION SHEETS BY INFERRING VISUAL RELATIONS

(71) Applicant: Tata Consultancy Services Limited, Mumbai (IN)

(72) Inventors: Rohit Rahul, Gurgaon (IN); Arindam Chowdhury, Gurgaon (IN); Lovekesh Vig, Gurgaon (IN); . Animesh, Gurgaon (IN); Samarth Mittal, Sancoale (IN)

(73) Assignee: Tata Consultancy Services Limited, Mumbai (IN)

( * ) Notice: Subject to any disclaimer, the term of this patent is extended or adjusted under 35 U.S.C. 154(b) by 106 days.

(21) Appl. No.: 16/285,107

(22) Filed: Feb. 25, 2019

(65) Prior Publication Data

US 2020/0167557 A1 May 28, 2020

(30) Foreign Application Priority Data

Nov. 28, 2018 (IN) .............................. 201821044939

(51) Int. Cl.
*G06K 9/00* (2006.01)
*G06T 7/136* (2017.01)
(Continued)

(52) U.S. Cl.
CPC ......... *G06K 9/00456* (2013.01); *G06F 17/15* (2013.01); *G06K 9/2063* (2013.01);
(Continued)

(58) Field of Classification Search
CPC ............. G06K 9/00456; G06K 9/2063; G06K 9/6218; G06K 2209/01; G06K 9/00852;
(Continued)

(56) References Cited

U.S. PATENT DOCUMENTS 10,685,255 B2 * 6/2020 Fuchs .................. G06K 9/6231
2011/0078191 A1 * 3/2011 Ragnet ............... G06K 9/00879
707/780

(Continued)

OTHER PUBLICATIONS

Scene Text Detection and Recognition: The Deep Learning Era (Year: 2019).*

(Continued)

*Primary Examiner* — Nizar N Sivji
(74) *Attorney, Agent, or Firm* — Finnegan, Henderson, Farabow, Garrett & Dunner, LLP

(57) ABSTRACT

This disclosure relates to digitization of industrial inspection sheets. Digital scanning of paper based inspection sheets is a common process in factory settings. The paper based scans have data pertaining to millions of faults detected over several decades of inspection. The technical challenge ranges from image preprocessing and layout analysis to word and graphic item recognition. This disclosure provides a visual pipeline that works in the presence of both static and dynamic background in the scans, variability in machine template diagrams, unstructured shape of graphical objects to be identified and variability in the strokes of handwritten text. The pipeline incorporates a capsule and spatial transformer network based classifier for accurate text reading and a customized Connectionist Text Proposal Network (CTPN) for text detection in addition to hybrid techniques for arrow detection and dialogue cloud removal.

17 Claims, 23 Drawing Sheets

(51) Int. Cl.
*G06F 17/15* (2006.01)
*G06K 9/20* (2006.01)
*G06K 9/62* (2006.01)
*G06N 3/04* (2006.01)

(52) U.S. Cl.
CPC ......... *G06K 9/6218* (2013.01); *G06N 3/0418* (2013.01); *G06T 7/136* (2017.01); *G06T 2207/20061* (2013.01)

(58) Field of Classification Search
CPC ............... G06K 9/00442; G06T 7/136; G06T 2207/20061; G06F 17/15; G06N 3/0418
See application file for complete search history.

(56) References Cited

U.S. PATENT DOCUMENTS

| | | | | |
|---|---|---|---|---|
| 2012/0106790 A1* | 5/2012 | Sultana | ............... | G06K 9/00241 382/103 |
| 2017/0372505 A1* | 12/2017 | Bhat | ............... | G06T 7/11 |
| 2019/0057505 A1* | 2/2019 | Pheiffer | ............... | G06T 7/136 |
| 2019/0065818 A1* | 2/2019 | Lee | ............... | G06T 5/003 |
| 2019/0318502 A1* | 10/2019 | He | ............... | G06N 3/08 |

OTHER PUBLICATIONS

Gaurav Gupta Information Extraction from Hand-marked industrial inspection sheets (Year: 2017).*
Garcia-Garcia A review on Deep Learning Techniques Applied to Semantic Segmentation (Year: 2017).*
Li, H. et al. (Jul. 2017). "Towards End-to-end Text Spotting with Convolutional Recurrent Neural Networks," *Cornell University;* 14 pages.
Ahmad, T. et al. "Symbolic Road Marking Recognition Using Convolutional Neural Networks," *2017 IEEE Intelligent Vehicles Symposium (IV),* Redondo Beach, CA, Jun. 11-14, 2017, 6 pages.
Jaderberg, M. et al. (2015). "Spatial Transformer Networks," *Advances in Neural Information Processing Systems 28,* pp. 1-9.
Nguyen, T.D. et al. (Aug. 2015). "Segmentation Mask Refinement Using Image Transformations," *Journal of Latex Class Files,* vol. 14, No. 8; pp. 1-10.
Pinheiro, P.O. et al. (Sep. 2016). "Learning to Refine Object Segments," *European Conference on Computer Vision;* pp. 1-18.

* cited by examiner

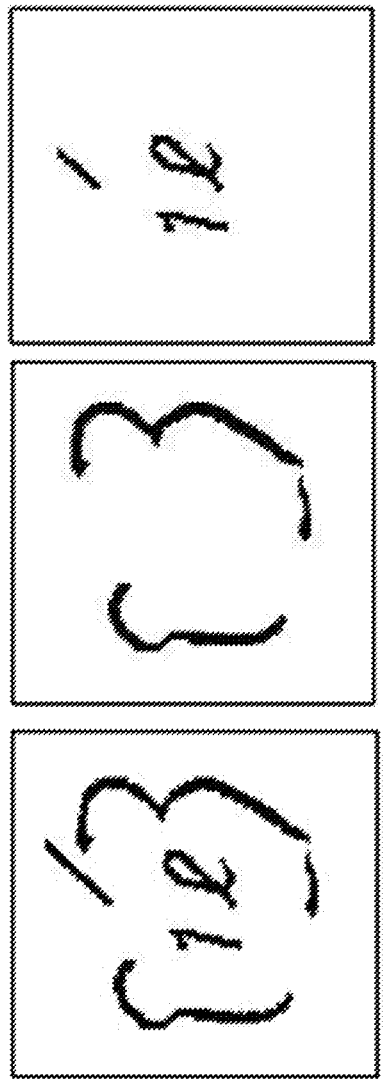

DIGITIZATION OF INDUSTRIAL INSPECTION SHEETS BY INFERRING VISUAL RELATIONS

PRIORITY CLAIM

This U.S. patent application claims priority under 35 U.S.C. § 119 to: Indian Patent Application No. 201821044939, filed on 28 Nov. 2018. The entire contents of the aforementioned application are incorporated herein by reference.

TECHNICAL FIELD

The disclosure herein generally relates to analyzing industrial inspection sheets, and, more particularly, to systems and computer implemented methods for digitizing the industrial inspection sheets by inferring visual relations.

BACKGROUND

The traditional mode of recording faults in heavy factory equipment has been via hand marked inspection sheets, wherein an inspection engineer manually marks the faulty machine regions on a paper outline of the machine. Over the years, millions of such inspection sheets have been recorded and the data within these sheets has remained inaccessible. However, with industries going digital and waking up to the potential value of fault data for machine health monitoring, there is an increased impetus towards digitization of these hand marked inspection records.

SUMMARY

Embodiments of the present disclosure present technological improvements as solutions to one or more of the above-mentioned technical problems recognized by the inventors in conventional systems.

In an aspect, there is provided a processor implemented method comprising the steps of: receiving, by one or more hardware processors, an input comprising a plurality of images, the plurality of images being characterized by identical one or more templates, wherein each template in the one or more templates comprises a static part being a line diagram representation of a machine having one or more predefined zones and a dynamic part comprising handwritten content associated with the one or more predefined zones of a corresponding machine; eliminating, by the one or more hardware processors, the one or more templates from each of the plurality of images based on the static part identified therein to obtain a plurality of de-templated images comprising the dynamic part, wherein the handwritten content comprises at least one of independent text patches and one or more dialogue clouds, associated with one or more connectors, wherein each of the one or more dialogue clouds include a text patch and a cloud surrounding the text patch; processing, by the one or more hardware processors, the plurality of de-templated images to eliminate the one or more dialogue clouds thereof to obtain a plurality of de-clouded images using an encoder-decoder based SegNet architecture for segmenting the one or more dialogue clouds, the de-clouded images comprising a plurality of text patches; detecting, by the one or more hardware processors, the one or more connectors in the plurality of de-clouded images by using the Convolutional Neural Network (CNN) classifier and the Hough Line Transform to detect at least one of one or more arrows and one or more lines respectively that constitute the one or more connectors; detecting, by the one or more hardware processors, coordinates of each text patch in each of the plurality of images of the input using the Connectionist Text Proposal Network (CTPN), the coordinates forming bounding boxes around each text patch; mapping each of the one or more connectors, by the one or more hardware processors, to a corresponding text patch based on the coordinates associated thereof and by using a clustering method; identifying, by the one or more processors, text associated with each text patch, in the American Standard Code for Information Interchange (ASCII) format, using the de-clouded image, the Capsule Network (CapsNet) and the Spatial Transformer Network (STN); and performing, by the one or more processors, one-to-one mapping of the identified text associated with each text patch to one of the one or more predefined zones of the corresponding machine, thereby providing a visual relation therebetween, by using the mapped one or more connectors and the coordinates of the corresponding text patch.

In another aspect, there is provided a system comprising: one or more data storage devices operatively coupled to one or more hardware processors and configured to store instructions configured for execution by the one or more hardware processors to: receive an input comprising a plurality of images, the plurality of images being characterized by identical one or more templates, wherein each template in the one or more templates comprises a static part being a line diagram representation of a machine having one or more predefined zones and a dynamic part comprising handwritten content associated with the one or more predefined zones of a corresponding machine; eliminate the one or more templates from each of the plurality of images based on the static part identified therein to obtain a plurality of de-templated images comprising the dynamic part, wherein the handwritten content comprises at least one of independent text patches and one or more dialogue clouds, associated with one or more connectors, wherein each of the one or more dialogue clouds include a text patch and a cloud surrounding the text patch; process the plurality of de-templated images to eliminate the one or more dialogue clouds thereof to obtain a plurality of de-clouded images using an encoder-decoder based SegNet architecture for segmenting the one or more dialogue clouds, the de-clouded images comprising a plurality of text patches; detect the one or more connectors in the plurality of de-clouded images by using the Convolutional Neural Network (CNN) classifier and the Hough Line Transform to detect at least one of one or more arrows and one or more lines respectively that constitute the one or more connectors; detect coordinates of each text patch in each of the plurality of images of the input using the Connectionist Text Proposal Network (CTPN), the coordinates forming bounding boxes around each text patch; map each of the one or more connectors to a corresponding text patch based on the coordinates associated thereof and by using a clustering method; identify text associated with each text patch, in the American Standard Code for Information Interchange (ASCII) format, using the de-clouded image, the Capsule Network (CapsNet) and the Spatial Transformer Network (STN); and perform one-to-one mapping of the identified text associated with each text patch to one of the one or more predefined zones of the corresponding machine, thereby providing a visual relation therebetween, by using the mapped one or more connectors and the coordinates of the corresponding text patch.

In yet another aspect, there is provided a computer program product comprising a non-transitory computer readable medium having a computer readable program embodied therein, wherein the computer readable program, when executed on a computing device, causes the computing device to: receive an input comprising a plurality of images, the plurality of images being characterized by identical one or more templates, wherein each template in the one or more templates comprises a static part being a line diagram representation of a machine having one or more predefined zones and a dynamic part comprising handwritten content associated with the one or more predefined zones of a corresponding machine; eliminate the one or more templates from each of the plurality of images based on the static part identified therein to obtain a plurality of de-templated images comprising the dynamic part, wherein the handwritten content comprises at least one of independent text patches and one or more dialogue clouds, associated with one or more connectors, wherein each of the one or more dialogue clouds include a text patch and a cloud surrounding the text patch; process the plurality of de-templated images to eliminate the one or more dialogue clouds thereof to obtain a plurality of de-clouded images using an encoder-decoder based SegNet architecture for segmenting the one or more dialogue clouds, the de-clouded images comprising a plurality of text patches; detect the one or more connectors in the plurality of de-clouded images by using the Convolutional Neural Network (CNN) classifier and the Hough Line Transform to detect at least one of one or more arrows and one or more lines respectively that constitute the one or more connectors; detect coordinates of each text patch in each of the plurality of images of the input using the Connectionist Text Proposal Network (CTPN), the coordinates forming bounding boxes around each text patch; map each of the one or more connectors to a corresponding text patch based on the coordinates associated thereof and by using a clustering method; identify text associated with each text patch, in the American Standard Code for Information Interchange (ASCII) format, using the de-clouded image, the Capsule Network (CapsNet) and the Spatial Transformer Network (STN); and perform one-to-one mapping of the identified text associated with each text patch to one of the one or more predefined zones of the corresponding machine, thereby providing a visual relation therebetween, by using the mapped one or more connectors and the coordinates of the corresponding text patch.

In accordance with an embodiment of the present disclosure, the one or more processors are further configured to eliminate the one or more templates by: inversing the plurality of images in the input; performing depth-wise averaging of the inversed plurality of images; applying adaptive thresholding to the averaged image for extracting the one or more templates; matching the extracted one or more templates with the input using the Normalized Cross Correlation method to obtain a correlation of each point in the one or more templates with the input; determining location of the one or more templates based on a point exhibiting a maximum correlation; and eliminating the one or more templates from the input based on the determined location thereof.

In accordance with an embodiment of the present disclosure, the one or more processors are further configured to process the plurality of de-templated images by: generating masks for the one or more dialogue clouds using the SegNet architecture that is pre-trained on a dataset of a plurality of dialogue cloud images to distinguish three classes including a background class, a boundary class and a dialogue cloud class; and subtracting the masks from the de-templated images to obtain the plurality of de-clouded images.

In accordance with an embodiment of the present disclosure, the in the plurality of de-clouded images by: detecting the one or more arrows using the CNN that is pre-trained to distinguish two classes including an arrow class and a background class; and detecting the one or more lines by using the Hough Line Transform to detect the present of the one or more lines; merging the detected one or more lines having a same slope and a Euclidean distance therebetween being less than 50 px (pixels); and filtering the one or more lines based on the mapping of the one or more connectors to the corresponding text patch.

In accordance with an embodiment of the present disclosure, the one or more processors are further configured to detect coordinates of each text patch in each of the plurality of images in the input by: localizing text lines using the CTPN to locate the bounding text boxes around each text patch; and sampling 480×360 px windows in each of the plurality of images with an overlap.

In accordance with an embodiment of the present disclosure, the one or more processors are further configured to map each of the one or more connectors to a corresponding text patch by: associating each of the one or more connectors to one of the bounding boxes around each text patch by extrapolating tails of the one or more arrows; and clustering the text patches using the clustering method such that number of text patches equals the number of the one or more connectors.

In accordance with an embodiment of the present disclosure, the clustering method is either a (ii) K-means clustering method, wherein K is the number of connectors associated with each of the bounding boxes or (ii) Mean-Shift Clustering method.

In accordance with an embodiment of the present disclosure, the one or more processors are further configured to identify text associated with each text patch by: segmenting each text patch using the Connected Component Analyses (CCA) to generate segments having one or more characters therein; ranking the segmented characters in the generated segments that are unordered to obtain characters arranged in a human readable form; using the CapsNet to recognize the generated segments having more than one characters therein; and using the STN to recognize the generated segments having one character therein.

In accordance with an embodiment of the present disclosure, the one or more processors are further configured to perform one-to-one mapping of the identified text associated with each text patch to one or more predefined zone by extrapolating the one or more connectors such that proximity of the text patch is indicative of a tail and proximity to a predefined zone is indicative of the arrow head.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 6A through FIG. 6C illustrate an output at various stages of obtaining a de-clouded image, in accordance with an embodiment of the present disclosure.

DETAILED DESCRIPTION OF EMBODIMENTS

Figure 1:
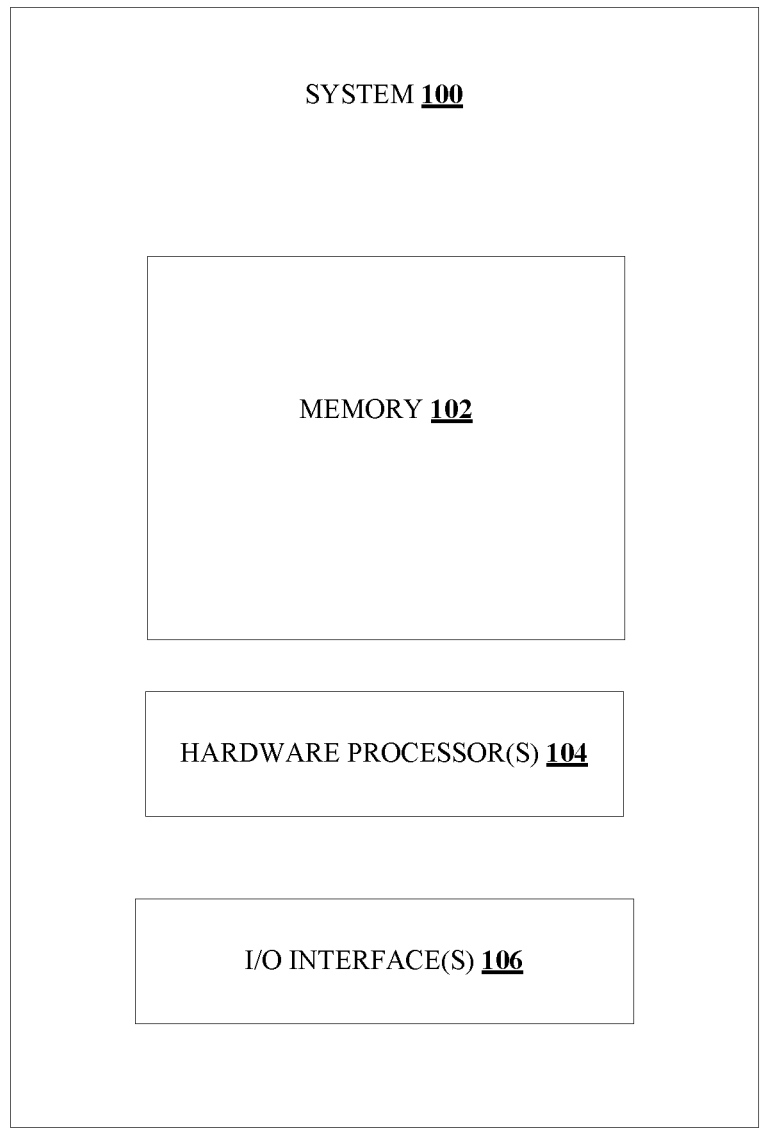
FIG. 1 illustrates an exemplary block diagram of a system for digitizing of industrial inspection sheets by inferring visual relations, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Industrial inspection of factory equipment is a common process in factory settings, involving physical examination of the equipment and subsequently marking faults on paper based inspection sheets. Paper based scans have data pertaining to millions of faults detected over several decades of inspection. Given the tremendous value of fault data for predictive maintenance, industries are keen to tap into the vast reservoir of fault data stored in the form of highly unstructured scanned inspection sheets and generate structured reports from them. Reliably detecting printed text has been addressed in the art, but the challenge in digitizing paper based scans includes detecting handwritten text considering possible variability of strokes, preprocessing of images having both static and dynamic content, variability in machine template diagrams, unstructured shape of graphical objects to be identified and layout analyses. The description provided hereinafter relates to information extraction from boiler and container inspection sheets. However, the system and method of the present disclosure may be applied to any machine, in general.

Referring now to the drawings, and more particularly to FIG. 1 through FIG. 13, where similar reference characters denote corresponding features consistently throughout the figures, there are shown preferred embodiments and these embodiments are described in the context of the following exemplary system and/or method.

FIG. 1 illustrates an exemplary block diagram of a system 100 for digitizing of industrial inspection sheets by inferring visual relations, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2A:
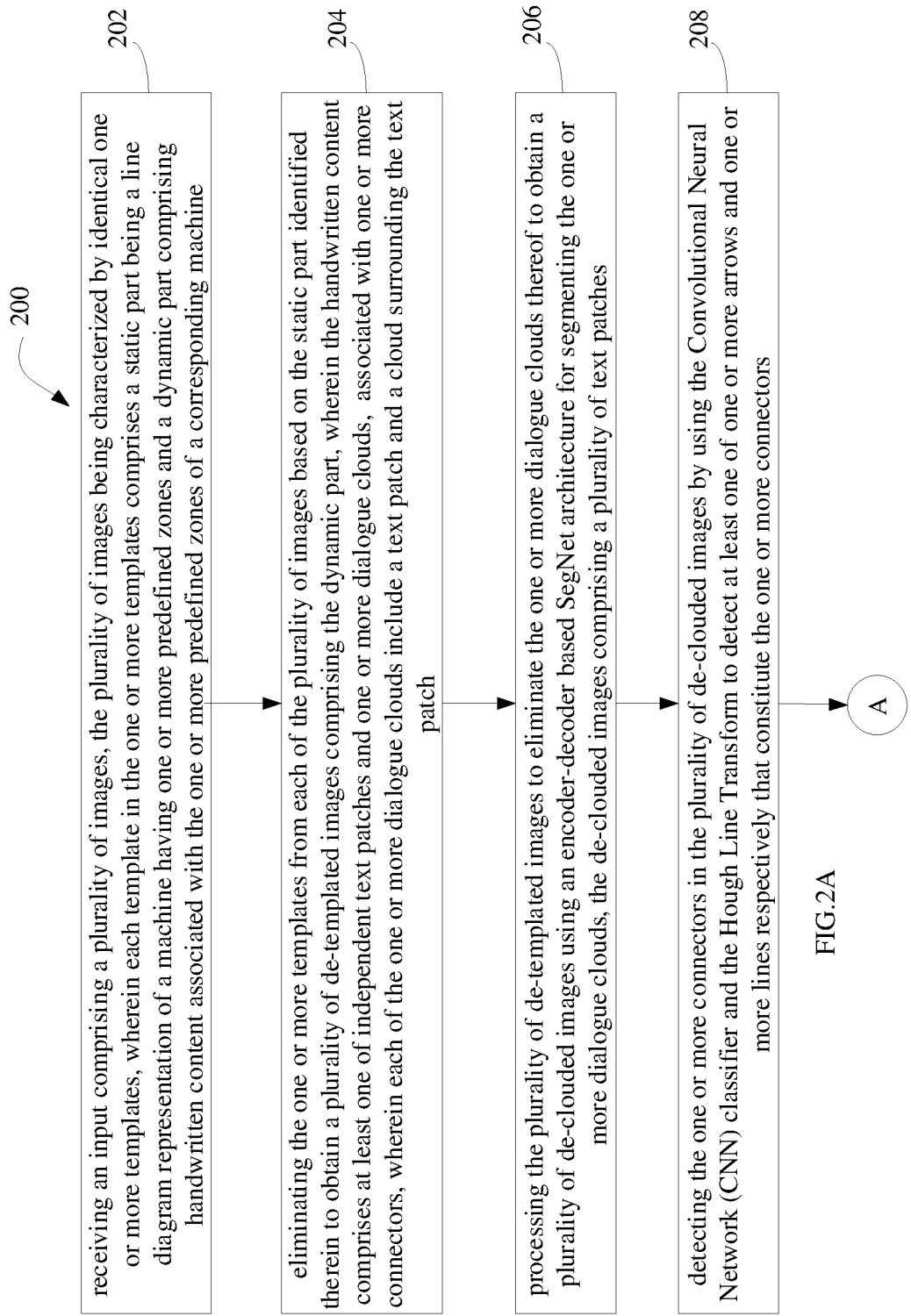
FIG. 2A and FIG. 2B illustrate an exemplary flow diagram of a computer implemented method for digitizing of industrial inspection sheets by inferring visual relations, in accordance with an embodiment of the present disclosure.
Figure 2B:
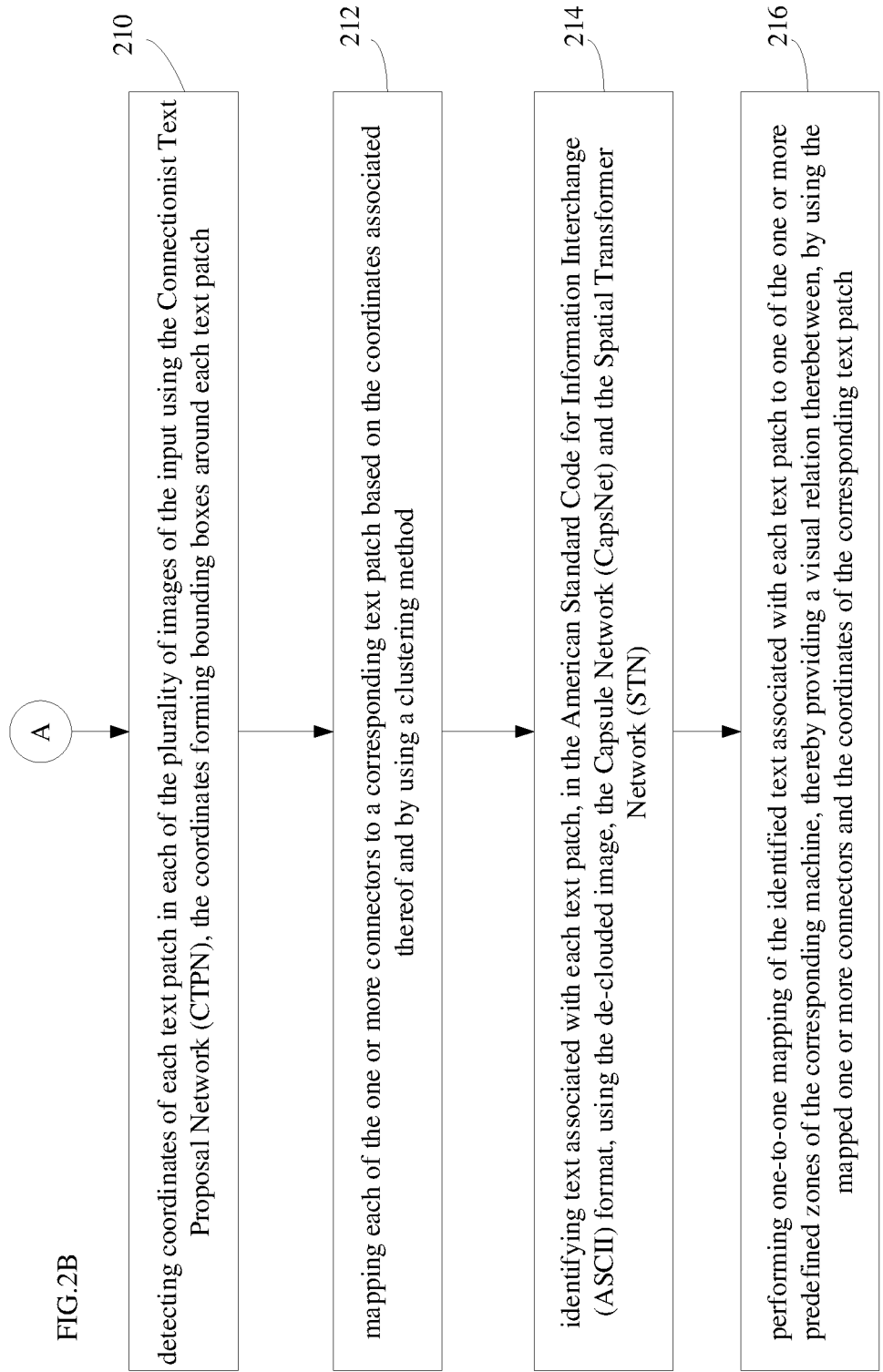

FIG. 2A and FIG. 2B illustrate an exemplary flow diagram for a computer implemented method 200 for digitizing of industrial inspection sheets by inferring visual relations, in accordance with an embodiment of the present disclosure. In an embodiment, the system 100 includes one or more data storage devices or memory 102 operatively coupled to the one or more processors 104 and is configured to store instructions configured for execution of steps of the method 200 by the one or more processors 104. The steps of the method 200 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Figure 3A:
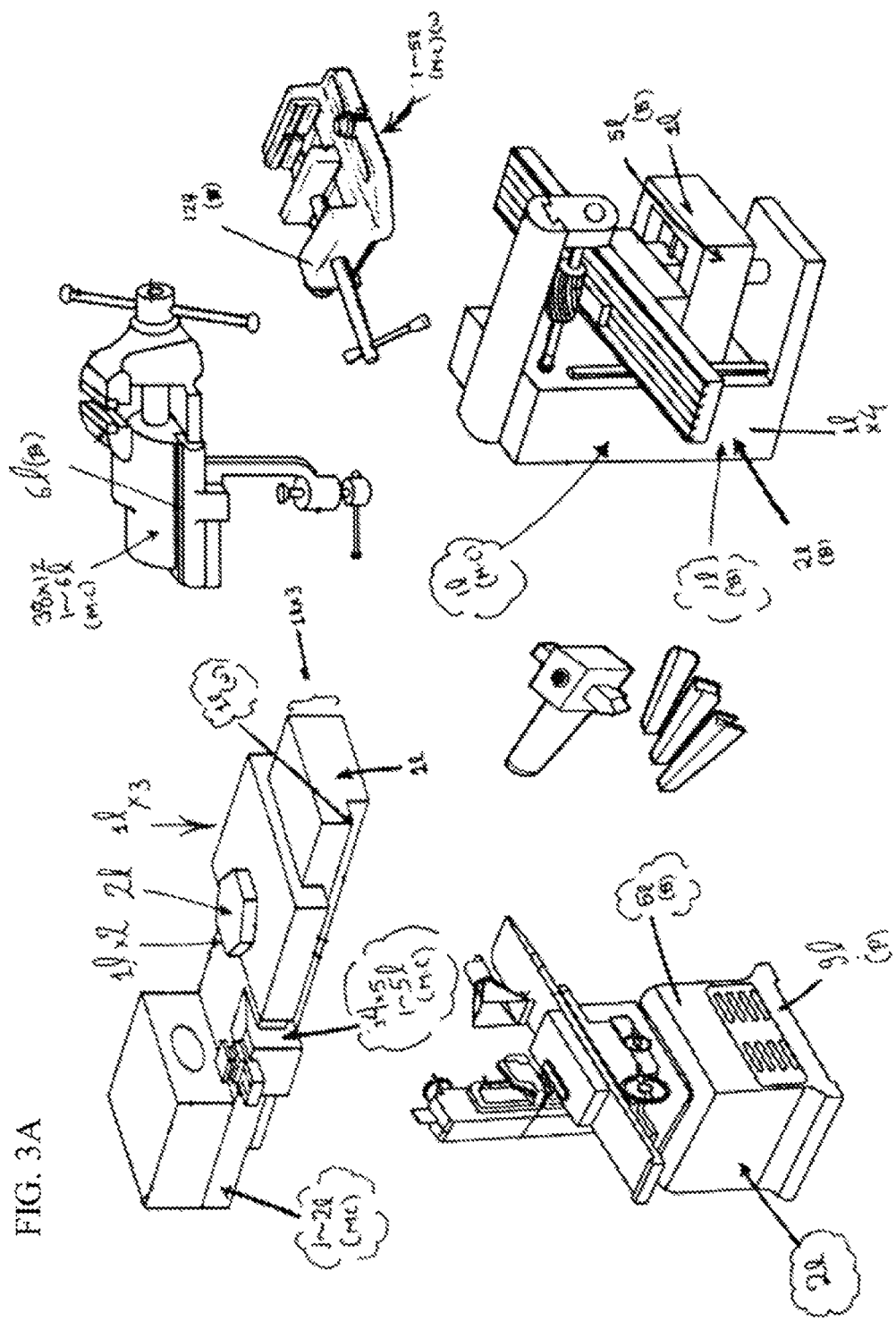
FIG. 3A illustrates an industrial inspection sheet and FIG. 3B illustrates essential components in the industrial inspection sheet, in accordance with an embodiment of the present disclosure.
Figure 3B:
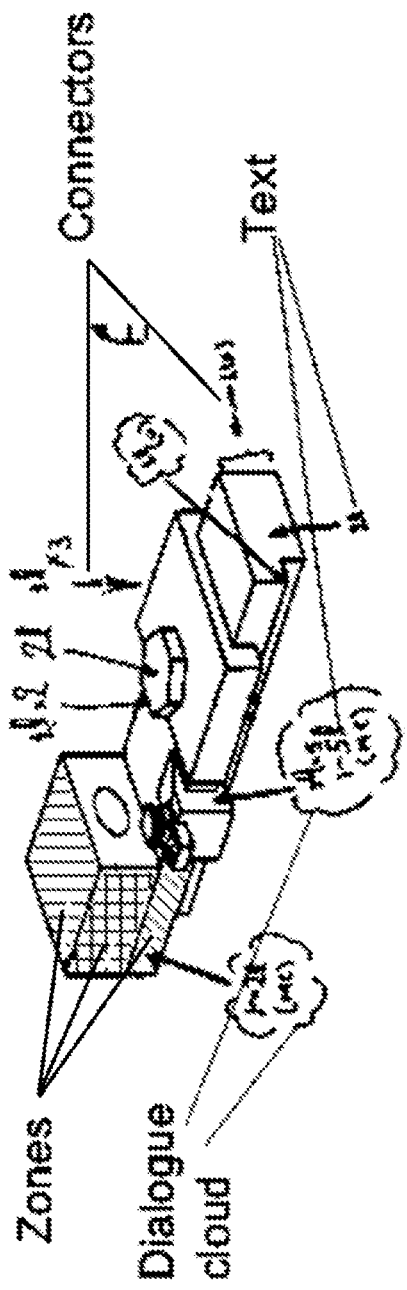

FIG. 3A illustrates an industrial inspection sheet and FIG. 3B illustrates essential components in the industrial inspection sheet, in accordance with an embodiment of the present disclosure. As seen in FIG. 3A, the industrial inspection sheet has printed line diagram representations of different types of machines, the individual line diagrams being referred as templates hereinafter. As seen in FIG. 3B, each template associated with a machine has the one or more predefined zones identified typically by an inspection engineer. The line diagram representations, say 3-Dimensional (3D) orthogonal views of the machine, form a static part of the template that remains constant over a set of inspection sheets. The inspection engineer typically marks handwritten content against a component of the machine where a damage may have occurred. The handwritten content associated with each of the one or more predefined zones constitute a dynamic part of the template. Typically, the handwritten content comprises damage codes and/or comments in the form of independent text patches. Some of the text patches may be surrounded by a cloud or a bubble and referred as a dialogue cloud hereinafter. The handwritten content also comprises one or more connectors marked such that each of the independent text patches and the dialogue clouds are associated with a connector to one of the one or more predefined zones to establish a visual relation between the pre-defined zones and the damage codes comprised in the text patch. In accordance with the present disclosure, the damage codes on the templates are localized and associated with a corresponding pre-defined zone to be stored as a digitized document. An analysis of the visual relation collected over the years may then be utilized for various purposes including machine health monitoring.

Figure 4A:
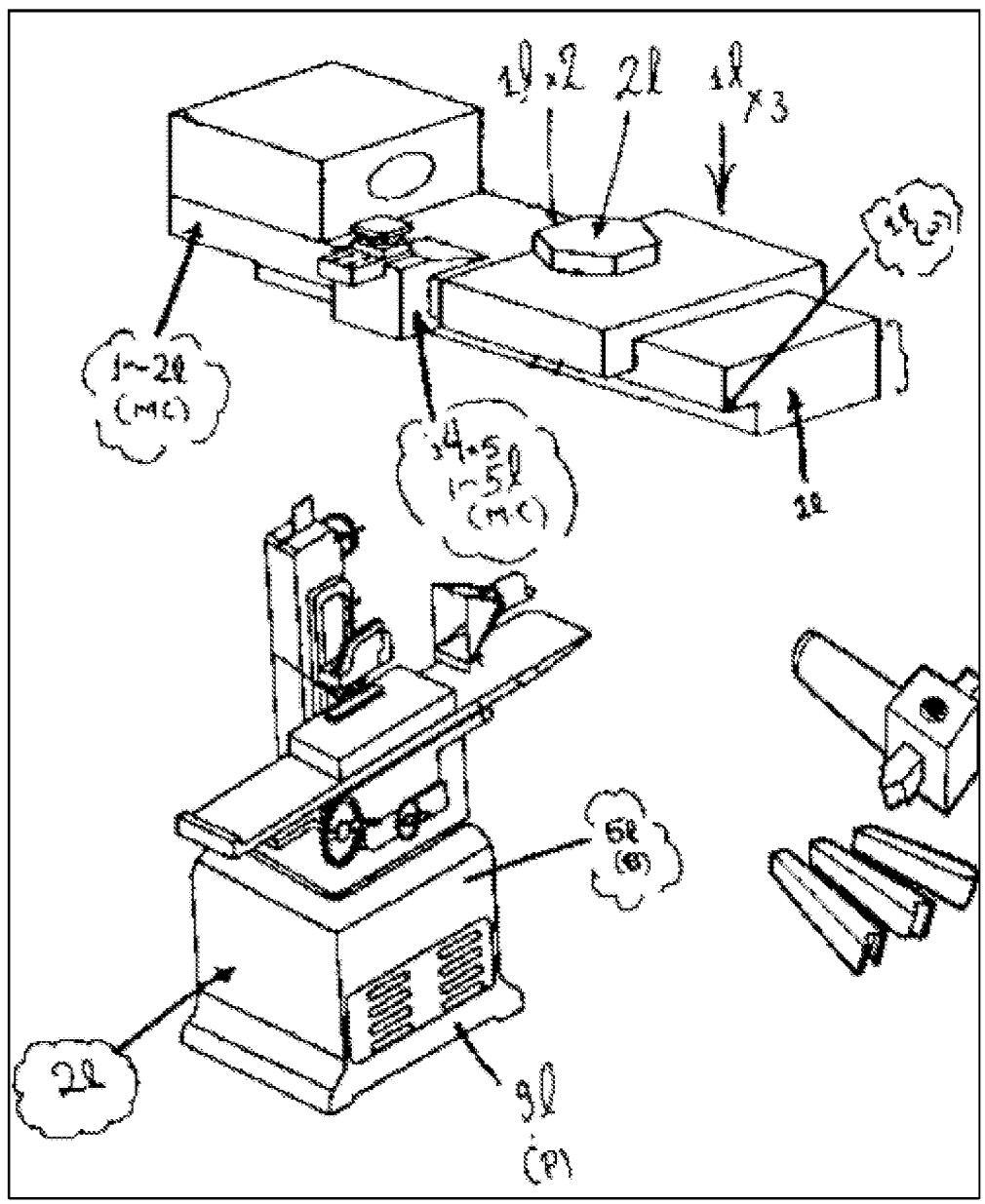
FIG. 4A through FIG. 4F illustrate an output at various stages of the method of FIGS. 2A and 2B, in accordance with an embodiment of the present disclosure.

FIG. 4A through FIG. 4F illustrate an output at various stages of the method of FIGS. 2A and 2B, in accordance with an embodiment of the present disclosure. In accordance with an embodiment of the present disclosure, the one or more processors 104 are configured to receive, at step 202, an input comprising a plurality of images, wherein the plurality of images are characterized by an identical set of templates and each template, as explained above, comprises the static part and the dynamic part. FIG. 4A illustrates an exemplary input, in accordance with an embodiment of the present disclosure. The templates and the dialogue clouds are then eliminated from the input.

Figure 4B:
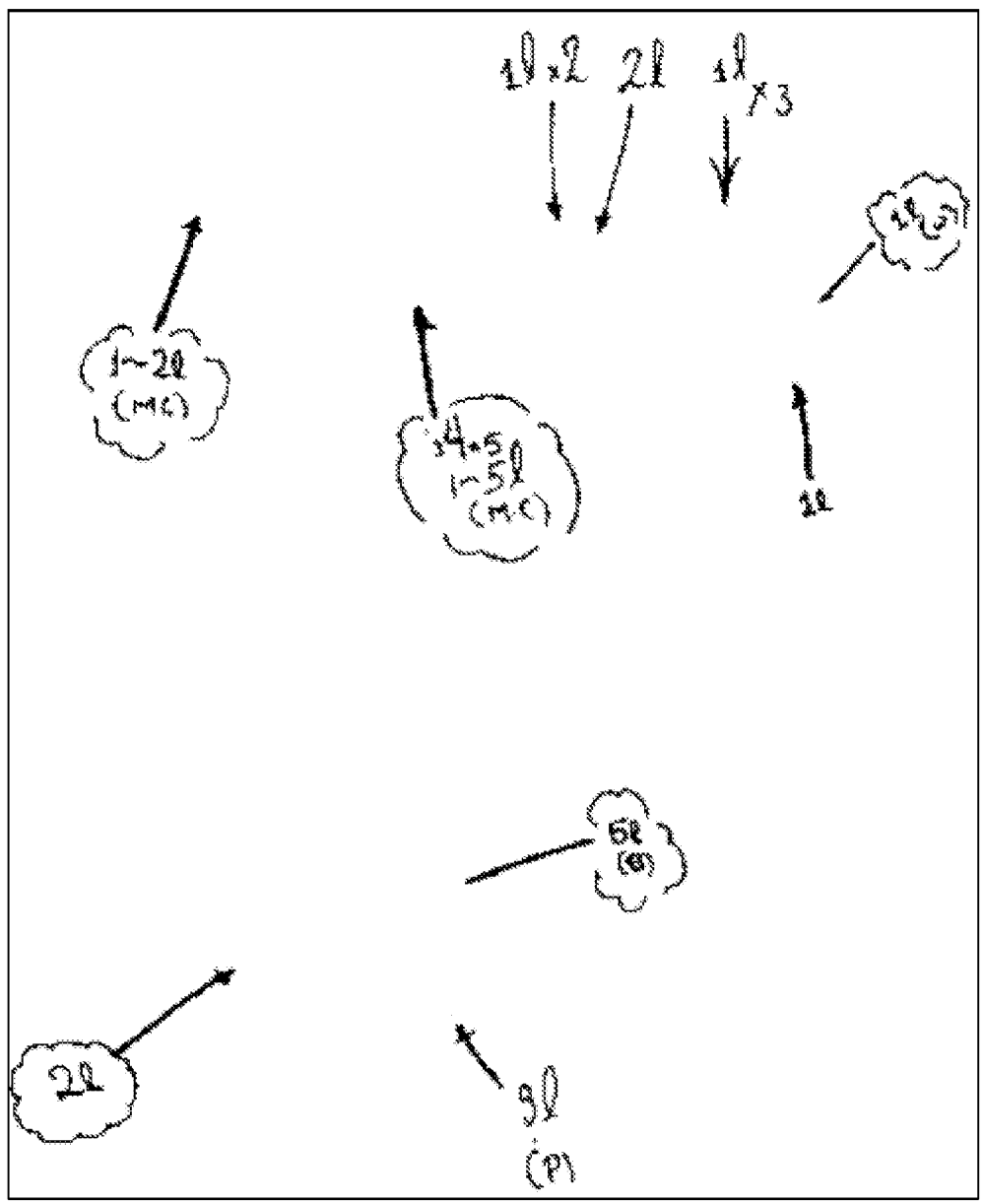

Accordingly, in with an embodiment of the present disclosure, the one or more processors 104 are configured to the eliminate, at step 204, the one or more templates from each of the plurality of images based on the static part identified in each of the templates to obtain a plurality of de-templated images. FIG. 4B Illustrates an exemplary de-templated image. In an embodiment, the de-templated images comprise the dynamic part, wherein the handwritten content include at least one of the independent text patches and the one or more dialogue clouds, associated with the one or more connectors.

In an embodiment, the step of eliminating the one or more templates comprises firstly inversing the plurality of images in the received input followed by depth-wise averaging of the inversed plurality of images and then applying adaptive thresholding to the averaged image for extracting the one or more templates. It may be noted that a relative start point of each template is not consistent across the plurality of images. Hence, there is a need to find each individual template and localize them in the plurality of images of the input. To this end, contours on the averaged image may be detected and arranged in a tree structure with an input image forming a root node with the detected templates forming the templates. The nodes at a depth 1 may then be identified as the individual templates. In an embodiment, the extracted one or more templates are matched with the input using the Normalized Cross Correlation method to obtain a correlation of each point in the one or more templates with the input. Location of the one or more templates is then determined based on a point exhibiting a maximum correlation. To eliminate a template that is localized as explained, the operator Not (T(i, j)) and R(i, j) is used, as shown below, on two images T and R where T represents a template image and R represents an input image.

$$R(x, y) = \frac{\Sigma_{x,y}(T(x', y') * I(x + x', y + y'))}{\sqrt{\Sigma_{x,y}T(x', y')^2 * \Sigma_{x,y}I(x + x', y + y')^2}}$$

Figure 5A:
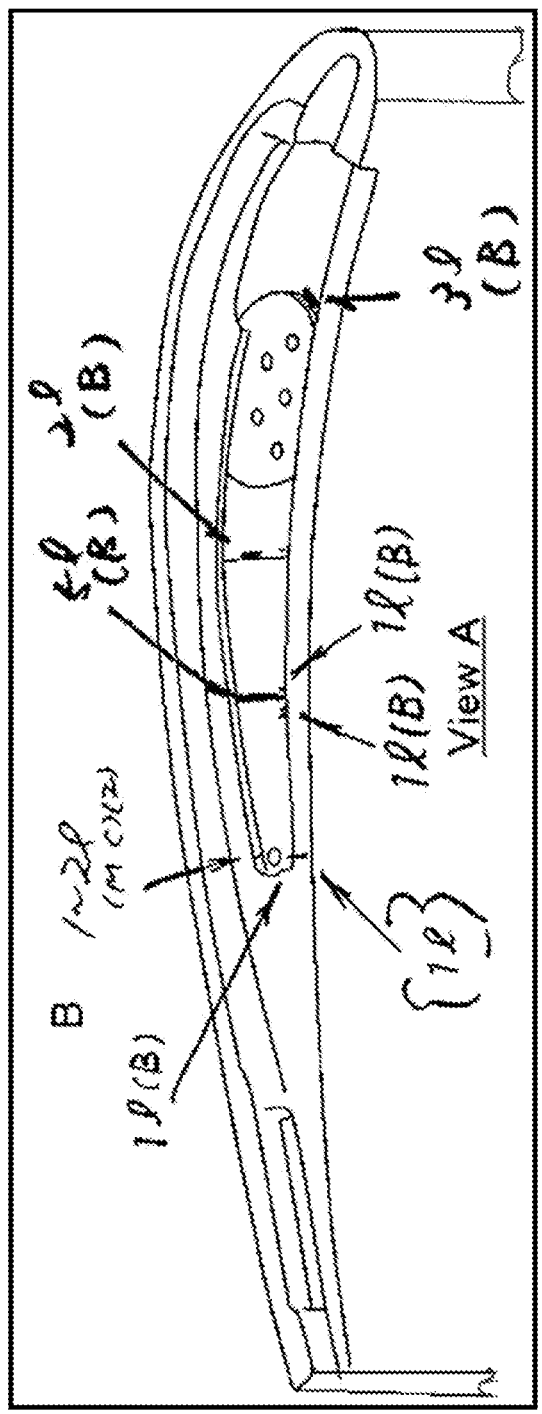
FIG. 5A illustrates an image in an input to the system of FIG. 1, in accordance with an embodiment of the present disclosure.
Figure 5B:
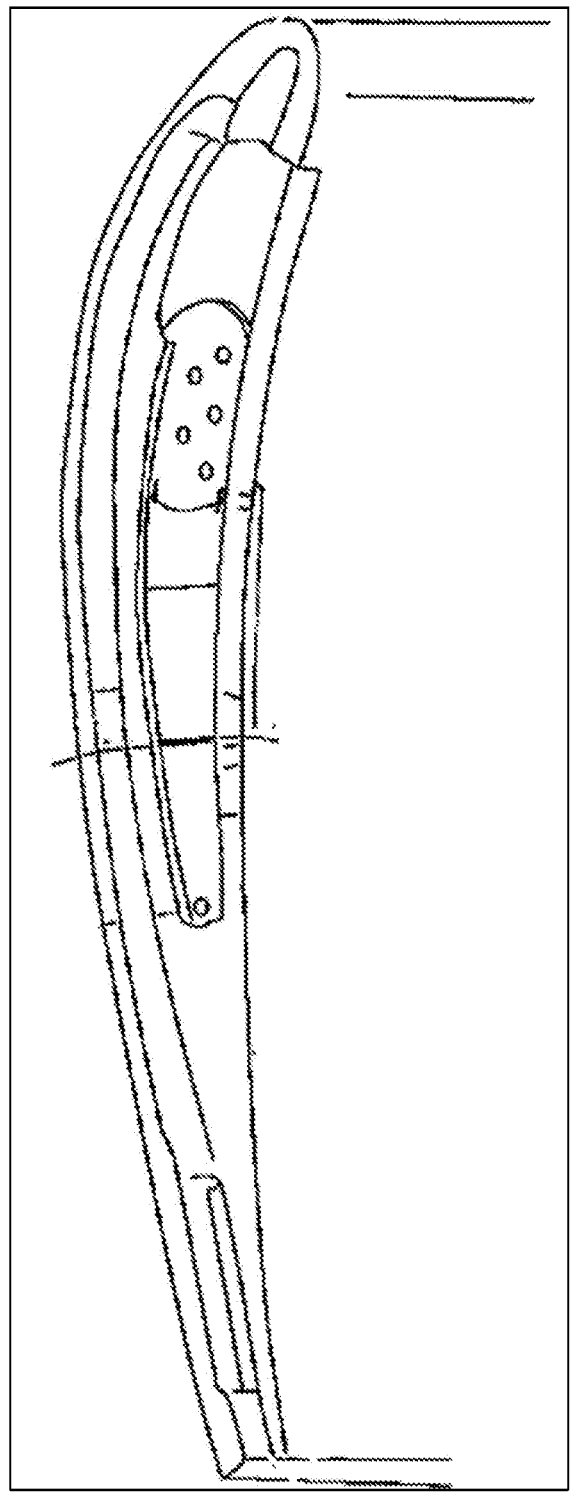
FIG. 5B illustrates a template in the image of FIG. 5A, in accordance with an embodiment of the present disclosure.
Figure 5C:
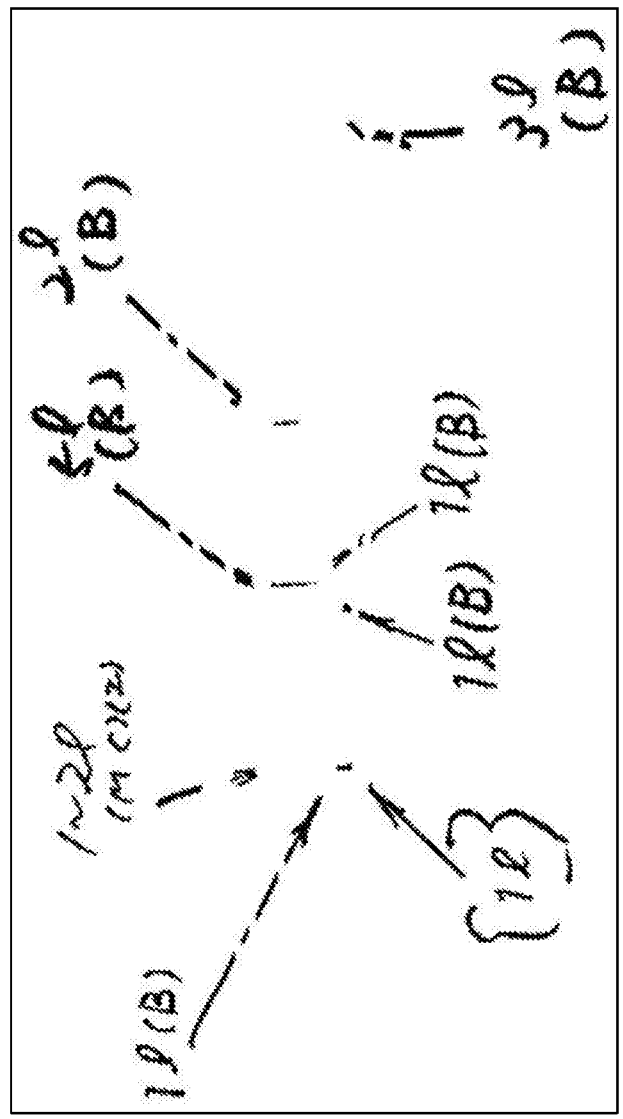
FIG. 5C illustrates a de-templated image, in accordance with an embodiment of the present disclosure.

FIG. 5A illustrates an image in an input to the system of FIG. 1, in accordance with an embodiment of the present disclosure. FIG. 5B illustrates a template in the image of FIG. 5A and FIG. 5C illustrates a de-templated image respectively, in accordance with an embodiment of the present disclosure.

Figure 4C:
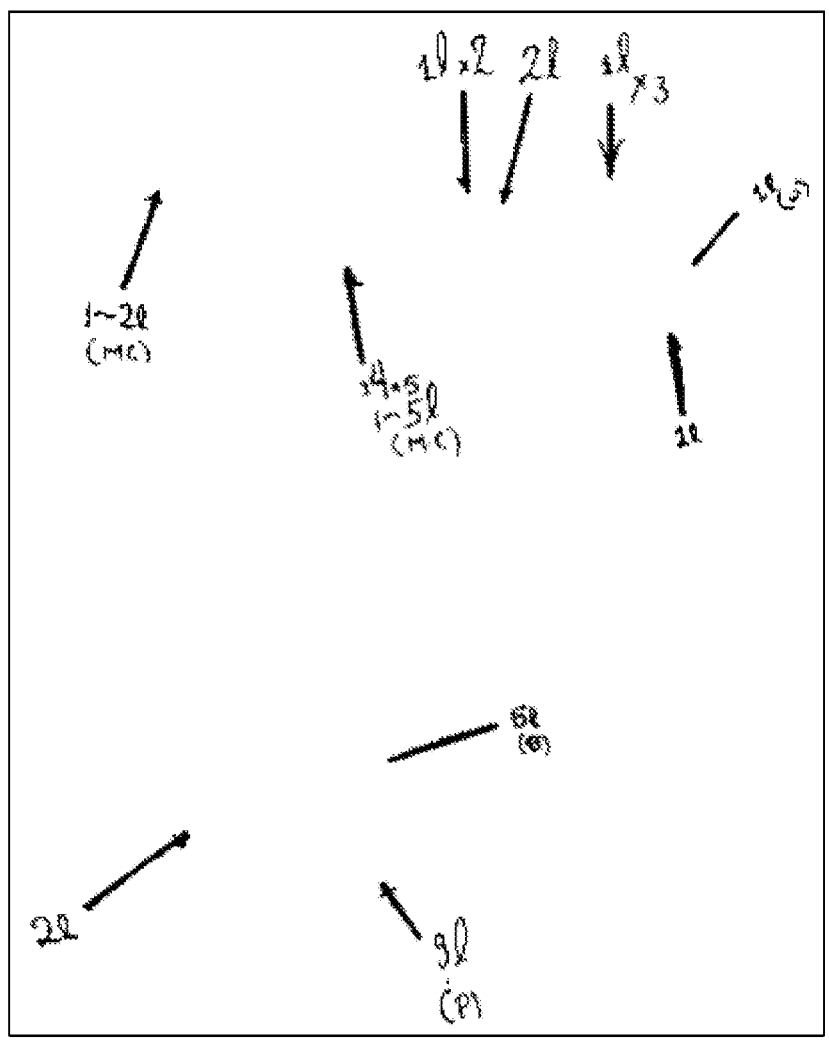

Dialogue clouds contain text patches as mentioned earlier. They are present sporadically in the plurality of images and interfere with the detection of the dynamic parts like the connectors and the text in the text patches. Accordingly, in an embodiment of the present disclosure, the one or more processors 104 are configured to process, at step 206, the plurality of de-templated images to eliminate the one or more dialogue clouds using an encoder-decoder based SegNet architecture for segmenting the one or more dialogue clouds and obtaining a plurality of de-clouded images. FIG. 4C illustrates a de-clouded image, in accordance with an embodiment of the present disclosure. It may be noted that the de-clouded images now comprise a plurality of text patches only.

In an embodiment, the step of processing the plurality of de-templated images comprise generating masks for the one or more dialogue clouds using the SegNet architecture that is pre-trained on a dataset of a plurality of dialogue cloud images to distinguish three classes including a background class, a boundary class and a dialogue cloud class. Generally, the SegNet architecture was able to learn the structure of a dialogue cloud. At times, the SegNet architecture may classify a few pixels as the background class which may lead to introduction of salt and pepper noise where the cloud was present, but this issue is addressed later at step is 214 when text associated with each text patch is identified. In an embodiment, the masks from the de-templated images are then subtracted to obtain the plurality of de-clouded images. FIG. 6A through FIG. 6C illustrate an output at various stages of obtaining a de-clouded image, in accordance with an embodiment of the present disclosure. It may be noted that the FIG. 6A represents a de-templated image, FIG. 6B represents the dialogue cloud and FIG. 6C represents a text patch obtained from the dialogue cloud of FIG. 6A.

Figure 4D:
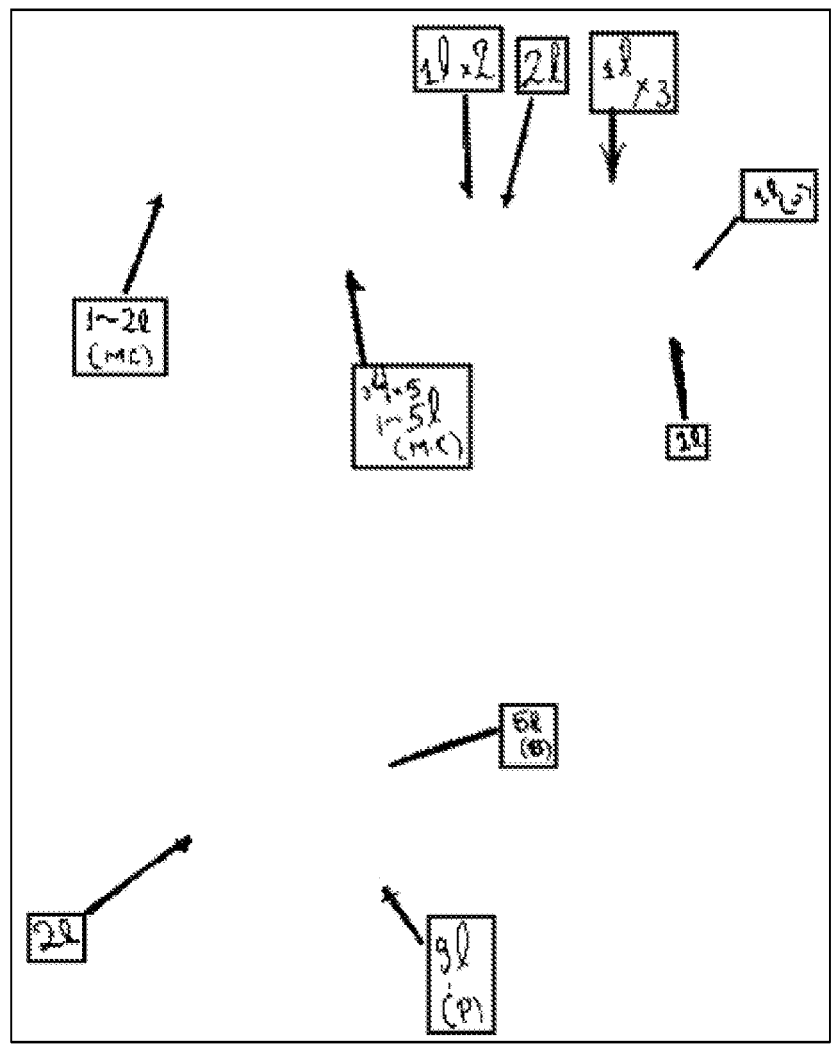

In accordance with the present disclosure, the next step involves localizing the text patches and the one or more connectors as shown in FIG. 4D. Towards this end, the one or more connectors need to be identified.

Connectors establish a one-to-one relation between the text patch and a corresponding pre-defined zone. The one or more connectors may manifest as arrows with a prominent head but may also often be just lines or multiple broken pieces of lines, adding to the complexity of the automation process. In accordance with the present disclosure, this problem is addressed using two approaches, wherein the Convolutional Neural Network (CNN) classifier is used to detect the arrows with prominent heads and the Hough Line Transform is used to detect the lines.

Accordingly, in an embodiment of the present disclosure, the one or more processors 104 are configured to detect, at step 208, the one or more connectors in the plurality of de-clouded images by using the Convolutional Neural Network (CNN) classifier and the Hough Line Transform to detect at least one of one or more arrows and one or more lines respectively that constitute the one or more connectors. In an embodiment, the one or more arrows are detected using the CNN that is pre-trained to distinguish two classes including an arrow class and a background class. It may be noted that including the connectors that do not have a prominent head (lines) confuses the CNN classifier and precision drops dramatically. Hence, in the present disclosure, the CNN classifier is used to detect the one or more connectors in the form of arrows with prominent head only. Subsequently, the information of the text patches are used to identify a tail and a head for each of the detected arrows.

Figure 7:
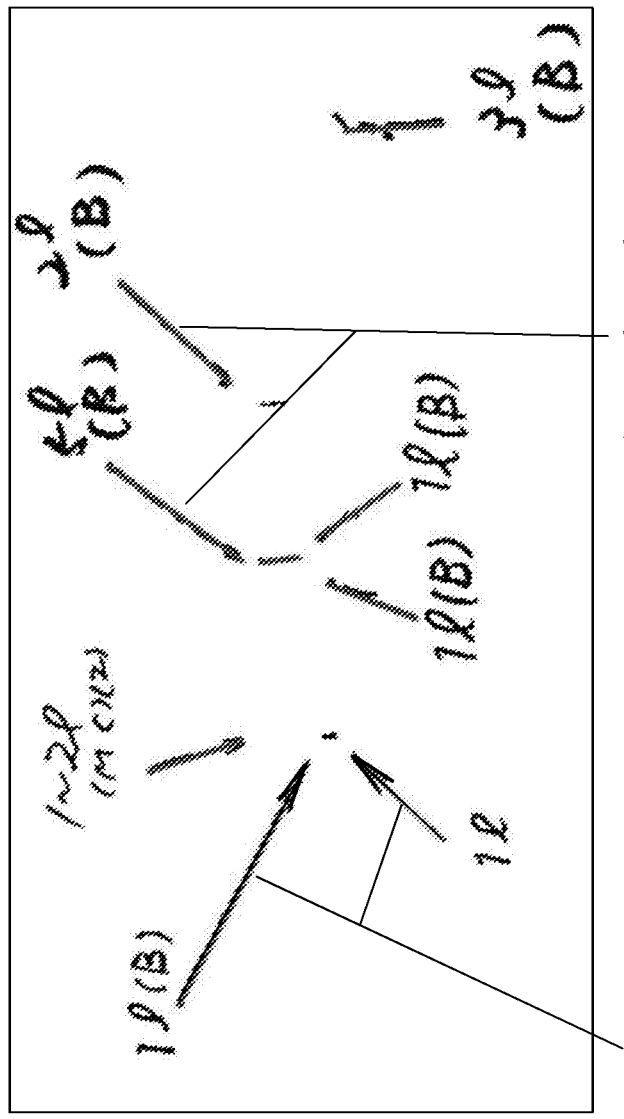
FIG. 7 illustrates an output when connectors are detected in the de-clouded images, in accordance with an embodiment of the present disclosure.

In accordance with an embodiment, once the arrows are detected, the one or more lines without a prominent head remain. The Hough Line Transform is used to detect the present of the one or more lines. The detected one or more lines having a same slope and having a Euclidean distance between them less than 50 px (pixels) are then merged. Line filtering is performed to filter the one or more lines based on the mapping (association) of the one or more connectors to the corresponding text patch. The filtering step helps remove detected noise. FIG. 7 illustrates an output when connectors are detected in the de-clouded images, in accordance with an embodiment of the present disclosure.

Figure 8A:
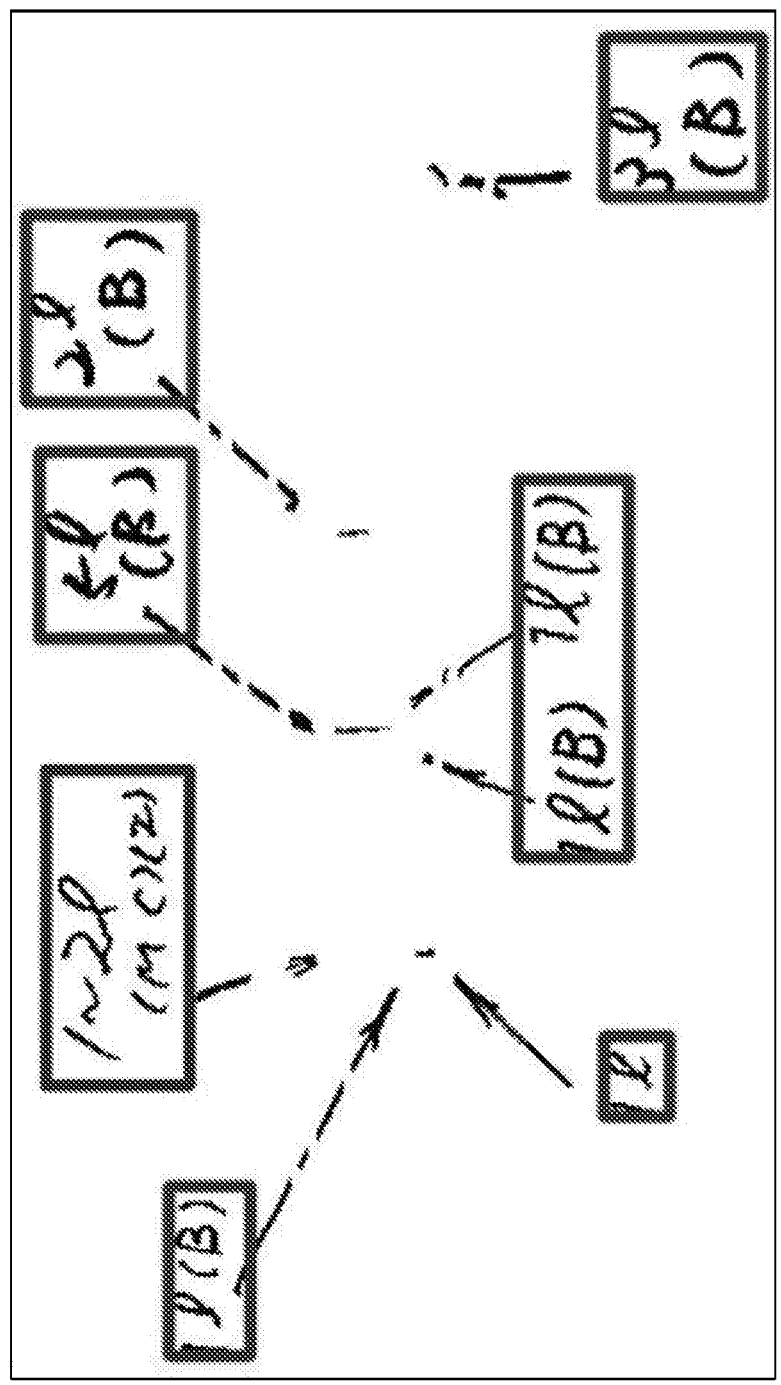
FIG. 8A illustrates text boxes detected by the Connectionist Text Proposal Network (CTPN), in accordance with an embodiment of the present disclosure.

The next stage in the pipeline involves text patch detection. The text patches in the plurality of images are usually present in the vicinity of a template. To detect the text patches, the Connectionist Text Proposal Network (CTPN) has been used. Accordingly, in an embodiment of the present disclosure, the one or more processors 104 are configured to detect, at step 210, coordinates of each text patch in each of the plurality of images of the input using the CTPN, wherein the coordinates form bounding boxes around each text patch. It may be noted that when the CTPN is trained on full size images, multiple text patches that occur collinearly are captured in a single bounding box. This anomaly resulted from low visual resolution of the individual text patches when looked at from a global context of an entire image. The CTPN simply captures any relevant text as a single item if they are horizontally close. Hence, in accordance with the present disclosure, 480×360 px windows are sampled in each of the plurality of images with an overlap. FIG. 8A illustrates text boxes detected by the CTPN, in accordance with an embodiment of the present disclosure. It may be noted from FIG. 8A, that there are some text boxes that contain more than one text patch.

Figure 8B:
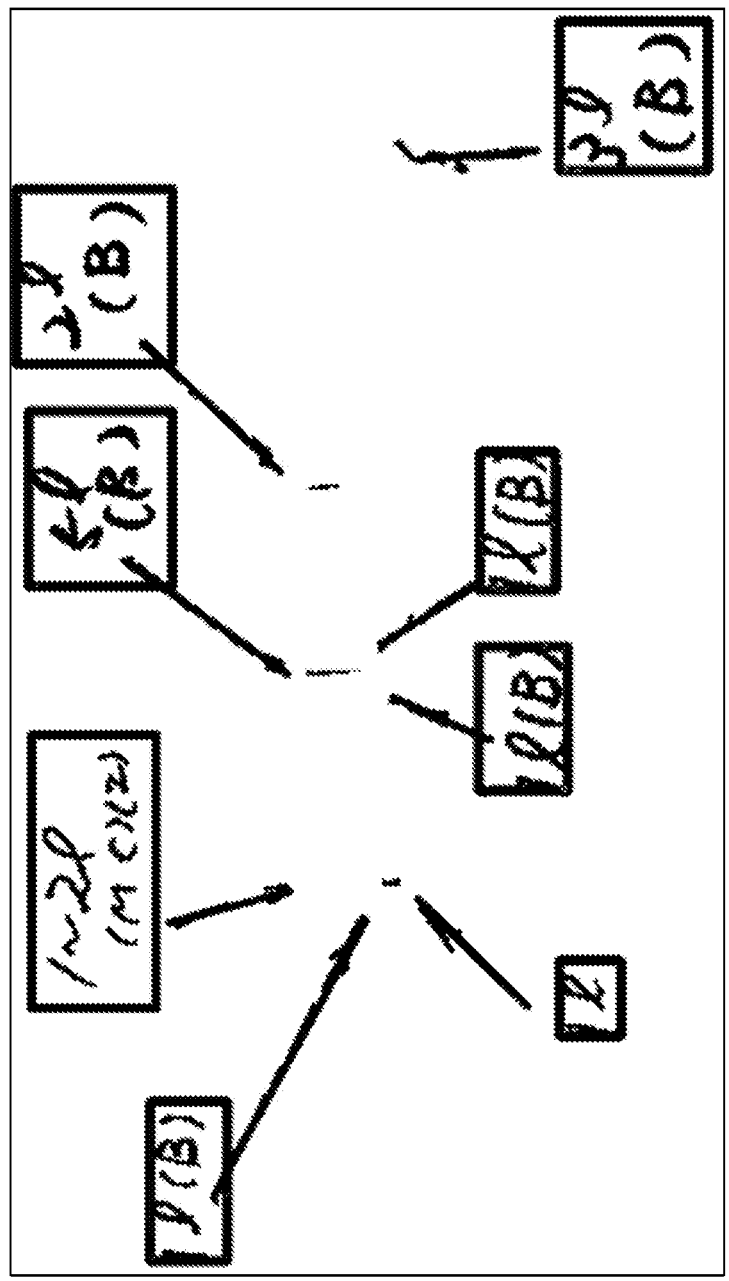
FIG. 8B illustrates the text boxes mapped with connectors, in accordance with an embodiment of the present disclosure.

In accordance with the present disclosure, to solve this problem, the information from the detected one or more connectors is used since each text patch must have a corresponding connector tail pointing to it. Accordingly, in an embodiment of the present disclosure, the one or more processors 104 are configured to map each of the one or more connectors, at step 212, to a corresponding text patch based on the associated coordinates associated by extrapolating tails of the one or more connectors and using a clustering method. In accordance with the present disclosure, the clustering method may be either a (ii) K-means clustering method, wherein K is the number of connectors associated with each of the bounding boxes or (ii) Mean-Shift Clustering method. Once all the detected one or more connectors are associated with a bounding box, the text patches are clustered such that the number of clusters are equal to the number of connectors. Accordingly, if there exists a bounding box that has two or more arrows associated with it, the same number of text patches as the number of connectors are required to be obtained, thereby ensuring that each text patch is associated with a single connector as shown in FIG. 8B that illustrates the text boxes mapped with connectors, in accordance with an embodiment of the present disclosure.

Figure 4E:
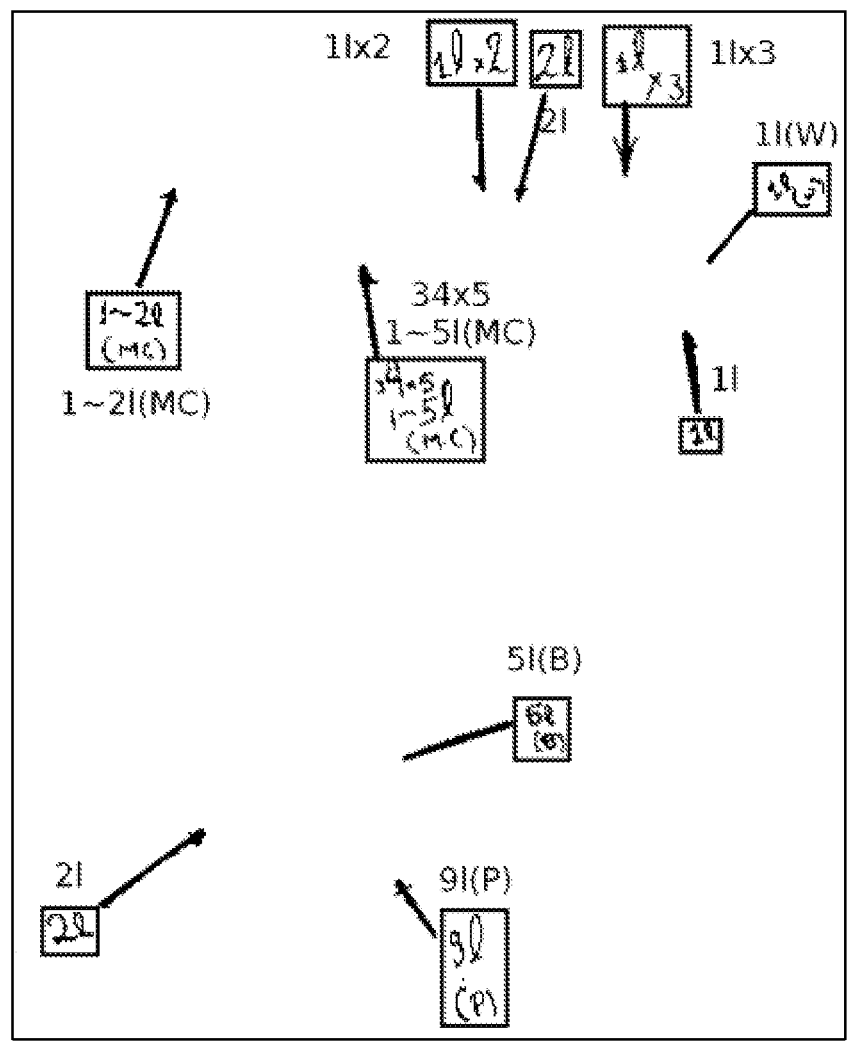
Figure 9:
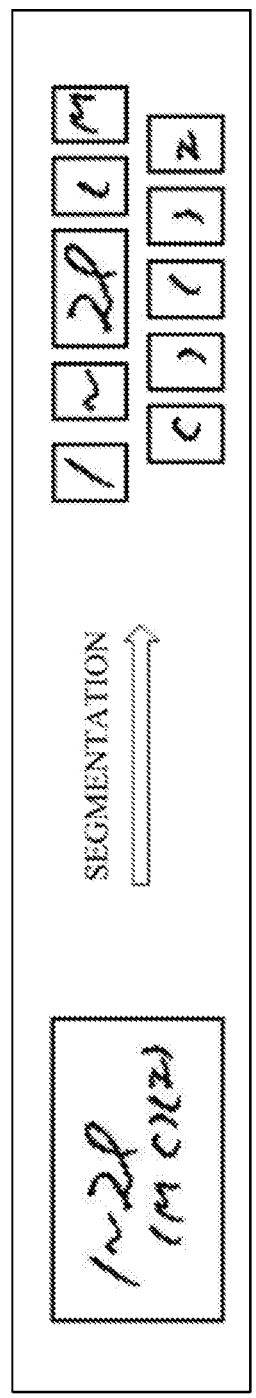
FIG. 9 illustrates an output of segmentation on a text patch, in accordance with an embodiment of the present disclosure.
Figure 10:
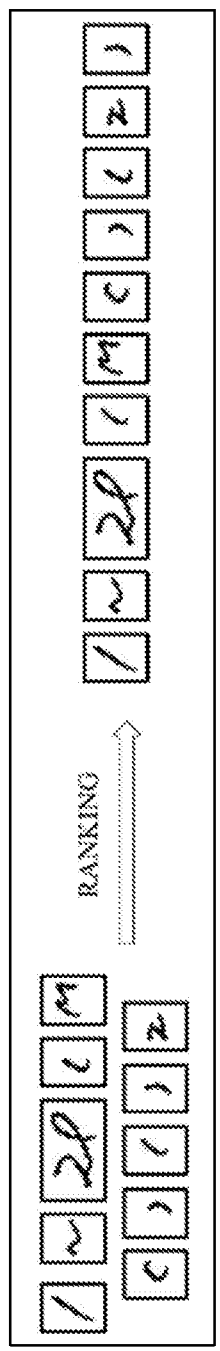
FIG. 10 illustrates an output of segmentation on a text patch after characters in the segment are ranked to obtain characters arranged in human readable form, in accordance with an embodiment of the present disclosure.

Text reading is the next stage in the pipeline for identifying the damage codes as illustrated in FIG. 4E. Accordingly, in an embodiment of the present disclosure, the one or more processors 104 are configured to identify, at step 214, text associated with each text patch, in the American Standard Code for Information Interchange (ASCII) format, using the de-clouded image, the Capsule Network (CapsNet) and the Spatial Transformer Network (STN). A main challenge in identifying text associated with each text patch arises from the fact that the damage codes constituting the text are not always structured horizontally in a straight line but consist of multiple lines with non-uniform alignments depending on the space available to write on the industrial inspection sheets as shown in FIG. 9. Due these irregularities, it is difficult to read an entire text sequence as a whole. Hence, in accordance with the present disclosure, one character is read at a time and then arranged in a proper order to generate a final sequence. The Connected Component Analyses (CCA) is used to segment each text patch and generate segments having one or more characters that are unordered. FIG. 9 illustrates an output of segmentation on a text patch, in accordance with an embodiment of the present disclosure. The CCA uses a region growing approach and can only segment out characters that neither overlap nor have any boundary pixels in common. So the CCA output may have one or more than one characters in a segment. Experiments showed that the segments had a maximum of two characters in them. The segmented characters are then ranked to obtain characters arranged in a human readable form (left-to-right or top-to-bottom). FIG. 10 illustrates an output of segmentation on a text patch after characters in the segment are ranked to obtain characters arranged in human readable form, in accordance with an embodiment of the present disclosure.

Figure 11:
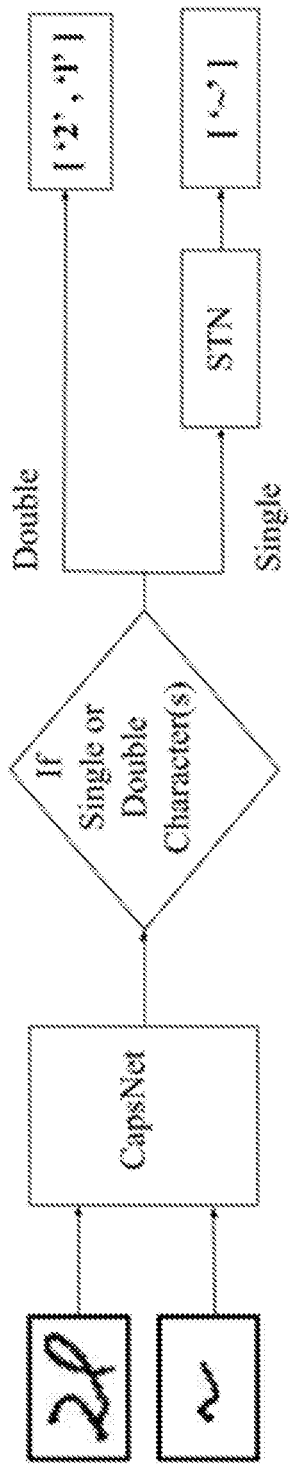
FIG. 11 illustrates use of the Capsule Network (CapsNet) and the Spatial Transformer Network (STN) for identifying text associated in a text patch, in accordance with an embodiment of the present disclosure.

In accordance with the present disclosure, character recognition is implemented as a two-step process. First step is to determine whether a segment contains one or two characters. The CapsNet is used to recognize the generated segments having more than one characters. The standard formulation of the CapsNet was modified by introducing a new output class 'None' representing the absence of any character in the image. Therefore, in case there is only a single character present in the segment, the CapsNet predicts 'None' as one of the two classes. The performance of the CapsNet was found to be limited. Hence the STN Was used to recognize single character segments. The STN consists of a differentiable module that can be inserted anywhere in the CNN architecture to increase it geometric invariance. As a result, the STN is more effective in addressing randomness in the spatial orientation of characters in the images, thereby boosting the recognition performance. Thus in accordance with the present disclosure, the CapsNet predictions recognize segments with more than one characters and the STN recognize segments with one character only. FIG. 11 illustrates use of the Capsule Network (CapsNet) and the Spatial Transformer Network (STN) for identifying text associated in a text patch, in accordance with an embodiment of the present disclosure.

Figure 12:
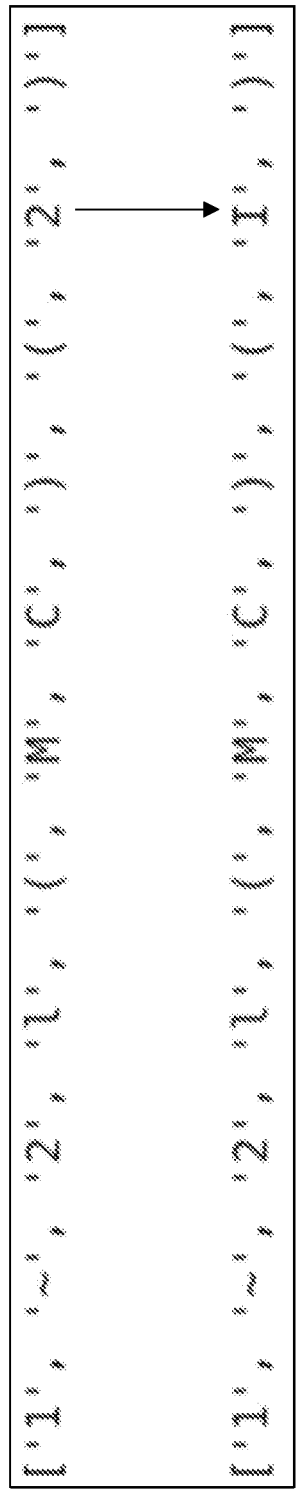
FIG. 12 illustrates correction made in the output of FIG. 11 based on grammar of damage codes, in accordance with an embodiment of the present disclosure.

In an embodiment of the present disclosure, a correction module may be incorporated in the system 100 to augment the neural network predictions using domain knowledge. In an embodiment, the correction may involve two parts. Firstly, a rule based approach that uses grammar of the damage codes may be implemented to rectify the predictions of the networks. For example, as per grammar, an upper case "B" can only be present between a pair of parenthesis, i.e. "(B)". If the networks predict "1B)", then the correction module corrects this part of the sequence by replacing the "1" by a "(". Secondly, an edit-distance based approach which finds the closest sequence to the predicted damage sequence from an exhaustive list of possible damage codes may be implemented. FIG. 12 illustrates correction made in the output of FIG. 11 based on grammar of damage codes, in accordance with an embodiment of the present disclosure.

Figure 4F:
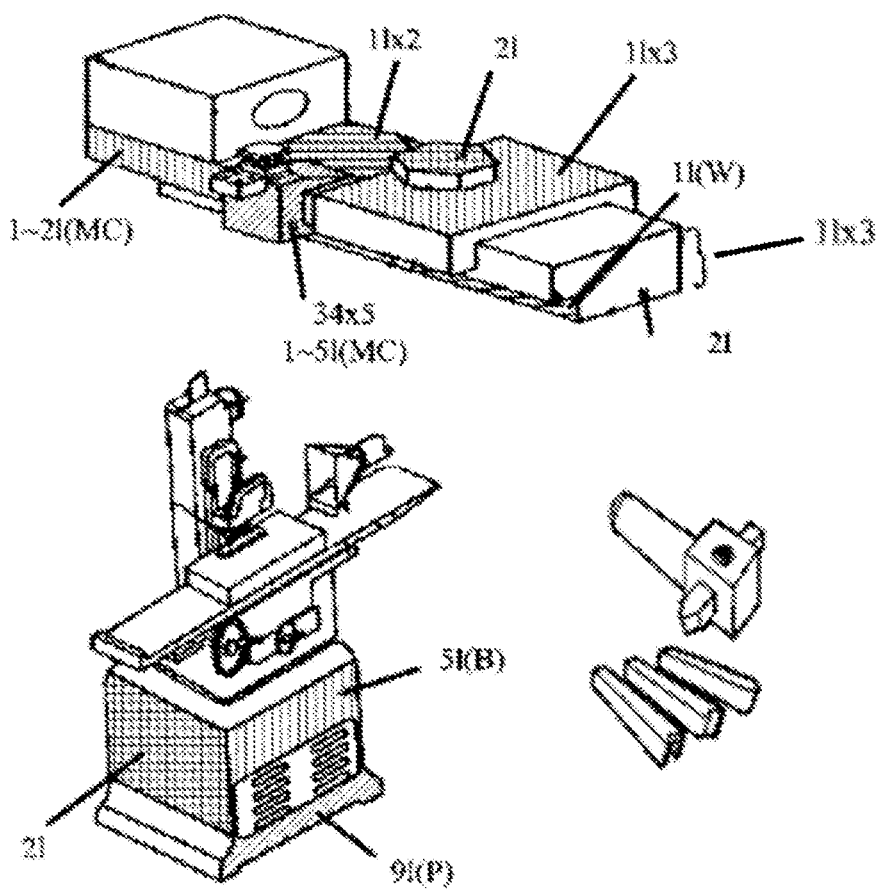
Figure 13:
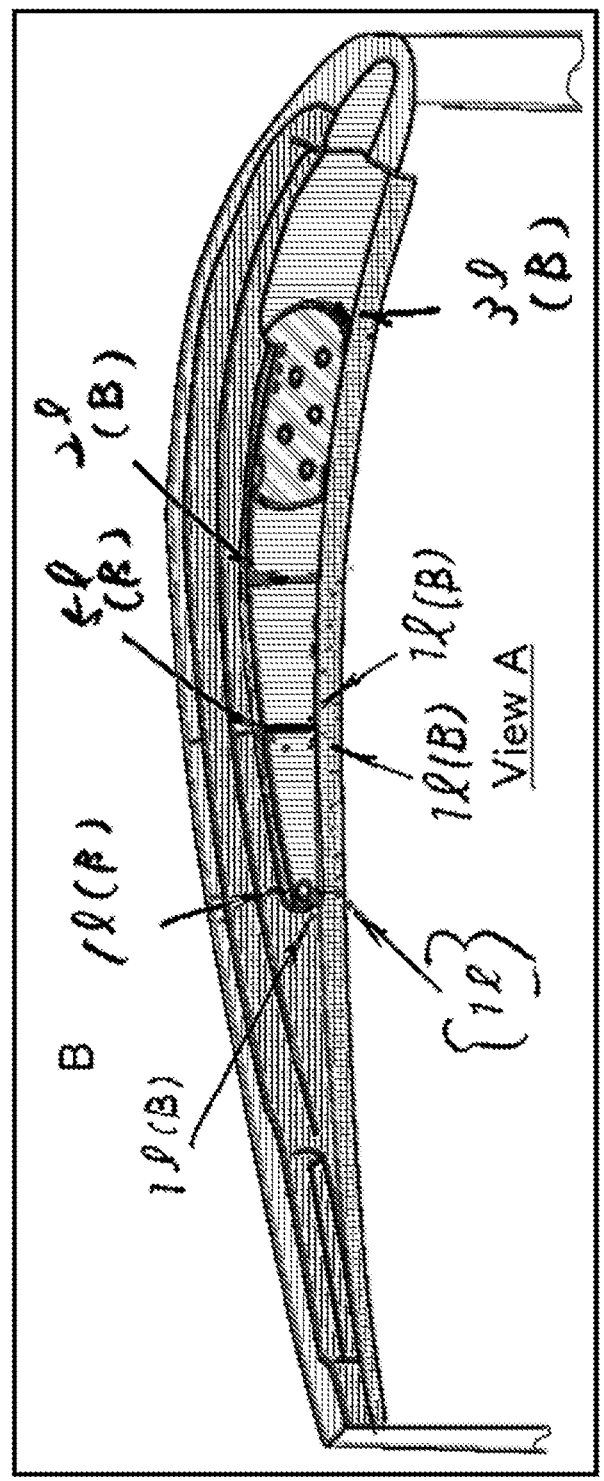
FIG. 13 illustrates one-to-one mapping of identified text associated with a text patch to one of one or more predefined zones of a corresponding machine, in accordance with an embodiment of the present disclosure.

Finally, a one-to-one mapping of the damage codes to the pre-defined zones is performed as illustrated in FIG. 4F, by leveraging the knowledge about the one or more connectors and coordinates of the text patches. Accordingly, in an embodiment of the present disclosure, the one or more processors 104 are configured to perform, at step 216, one-to-one mapping of the identified text associated with each text patch to one of the one or more predefined zones of the corresponding machine using the mapped one or more connectors and the coordinates of the corresponding text patch. FIG. 13 illustrates one-to-one mapping of identified text associated with a text patch to one of one or more predefined zones of a corresponding machine, in accordance with an embodiment of the present disclosure. The head of the one or more connectors point to a corresponding pre-defined zone while the tail points to a corresponding text patch. In an embodiment, the ray casting method may be implemented. When the connectors are extrapolated, the pre-defined zone they intersect first may be identified as the relevant zone to be associated with a corresponding text patch at its tail as shown in FIG. 13.

Experiment

A dataset having 72 different kinds of machine structures distributed across 10 sets of images was used. There were 50 equally distributed images for testing. This implies that a particular set has same machine line diagrams forming the static background. For training purpose, a separate set of 450 images were kept with same distribution of background machine line diagram sets. All the sheets were in JPEG format with a resolution of 3500×2400 sq. px. They were converted into inverted binarized version where the foreground is white and background is black. The conversion was done by Otsu's binarization.

Dialogue cloud segmentation: For this process, the SegNet architecture was trained on 200 images. The cloud pixels and the background pixels were classified. As there was an imbalance noted, the classes were weighted by 8.72 for the foreground and 0.13 for the background.

Arrow classifier: The CNN includes 6 convolution layers and 2 fully connected layer with ReLU activation. Max pool and dropout (with 0:5 probability) was used for regularization. The learning rate of 0:001 was set and the optimizer provided by Adam in "A method for stochastic optimization" arXiv preprint arXiv:1412.6980 was used with cross entropy loss to train it on 800 images with equal number of images per class. The network was initialized using the Xavier initializer and trained till best validation accuracy achieved was after 50 epochs. Batch Normalization was used with every convolution layer so as to make the network converge faster. The network was 99:7% accurate on a balanced test set of 400 images. The input images were resized to (128×128) with padding such that the aspect ratio of the images was undisturbed.

Capsule network: The CapsNet was used for classifying overlapping characters on the MNIST dataset. The learning rate was set to 0.0005 and the Adam Optimizer was used to train the network on all the single characters as well as on all the possible pairs of characters proximate each other.

STN: These are convolutional neural networks containing one or several Spatial Transformer modules. These modules try to make the network spatially invariant to its input data, in a computationally efficient manner, leading to more accurate object classification results. The architecture provided by Jaderberg et al. in "Spatial transformer networks" in "Advances in neural information processing systems" was used. The network was trained on this network on images of all the 31 characters All the input images were padded and resized to 32×32 so that they do not lose their original aspect ratio.

Experimental Results

Table 1 provides the accuracy of individual components for text extraction and mapping

TABLE 1

| Component | Accuracy |
| --- | --- |
| Connector detection | 89.7% |
| CTPN | 91.6% |
| Patch Association | 95.1% |
| Clustering | 95.6% |
| Zone mapping | 96.4% |

Table 2 provides the accuracy of individual components for text reading

TABLE 2

| Component | Accuracy |
| --- | --- |
| CCA | 97.54% |
| Ranking | 98.08% |
| CapsNet (Overlap) | 66.11% |
| CapsNet (Non-overlap) | 89.59% |
| STN | 95.06% |
| Sequence Reading | 94.63 |

Table 3 provides cumulative accuracy for the complete framework of the present disclosure.

TABLE 3

| Component | Individual Accuracy | Cumulative Accuracy |
|---|---|---|
| Text Association | 87.1% | 87.1% |
| Text Reading | 94.63% | 82.3% |

Analyses of the Test Results

The result of the connector detection is shown in Table 1. A total of 385 arrows were correctly localized out of 429 arrows present. The detection was performed on the images where the templates were removed. A majority of the false negatives occurred as a result of probabilistic Hough lines missing the entire line or most of the line, resulting in its removal during the arrow filtering stage.

The result of the text patch detection using CTPN is shown in Table 1. 392 text patches out of a total of 429 text patches were correctly detected. It missed a few text patches entirely and resulted in a few false negatives in which a bounding box was generated enclosing more than a single text inside it. Out of the 392 text patches, that the CTPN detected, 374 were correctly associated with an arrow, giving a patch association accuracy shown in Table 1.

For the boxes that were associated with multiple arrows (false negative of CTPN enclosing more than a single text patch), K-means clustering was applied on the connected components belonging to the same text patch. Out of 23 such text patches which needed clustering, 22 of them correctly yielded an overall accuracy of 95.6% as shown in Table 1.

The text reading experiment was performed on 349 image patches. The accuracy of the CCA was calculated as the percentage of correct character output in the total number of outputs. Ranking accuracy was calculated as a percentage of correct rankings done by the total number of images patches. The performance of the CapsNet was measured for two tasks mentioned in Table 2, one being the recognition of the overlapping characters and the other being character level recognition in cases of non-overlapping characters. The STN accuracy shows the character level accuracy which is better that the character level accuracy of the CapsNet. The sequence level accuracy was measured by computing the ground truth as well as the final predictions of the networks passing through both the correction modules as shown in the Table 2. The prediction was considered as correct if and only if all the characters in the predicted string match with the ground truth in the correct order. The cumulative accuracy of the framework is provided in Table 3.

Thus system and method of the present disclosure provided a detection accuracy of 87.1% for detection and 94.63% for reading, thereby achieving high accuracy. It is also noted to be robust to different types of noise in arrow, cloud, text detection and character recognition.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method (200) comprising the steps of:
receiving, by one or more hardware processors, an input comprising a plurality of images, the plurality of images being characterized by identical one or more templates, wherein each template in the one or more templates comprises a static part being a line diagram representation of a machine having one or more predefined zones and a dynamic part comprising handwritten content associated with the one or more predefined zones of a corresponding machine (202);
eliminating, by the one or more hardware processors, the static part from the one or more templates from each of the plurality of images to obtain a plurality of de-templated images comprising the dynamic part, wherein the handwritten content comprises one or more independent text patches and one or more dialogue clouds surrounding the independent text patches, associated with one or more connectors (204);
processing, by the one or more hardware processors, the plurality of de-templated images to eliminate the one or more dialogue clouds thereof to obtain a plurality of de-clouded images using an encoder-decoder based SegNet architecture for segmenting the one or more dialogue clouds, the de-clouded images comprising a plurality of text patches (206), wherein the SegNet architecture is pre-trained on a dataset of a plurality of dialogue cloud images;
detecting, by the one or more hardware processors, the one or more connectors in the plurality of de-clouded images by using a Convolutional Neural Network (CNN) classifier and a Hough Line Transform to detect at least one of one or more arrows and one or more lines respectively that constitute the one or more connectors (208);
detecting, by the one or more hardware processors, coordinates of each text patch in each of the plurality of images of the input using a Connectionist Text Proposal Network (CTPN), the coordinates forming bounding boxes around each text patch (210);
mapping each of the one or more connectors, by the one or more hardware processors, to a corresponding text patch based on the coordinates associated thereof and by using a clustering method (212);
identifying, by the one or more hardware processors, text associated with each text patch, in American Standard Code for Information Interchange (ASCII) format, using the de-clouded image, a Capsule Network (CapsNet) and a Spatial Transformer Network (STN) (214), wherein identifying the text associated with each text patch comprises:
segmenting each text patch using a Connected Component Analyses (CCA) to generate segments having one or more characters therein;
ranking the segmented characters in the generated segments that are unordered to obtain characters arranged in a human readable form;
using the CapsNet to recognize the generated segments having more than one characters therein; and
using the STN to recognize the generated segments having one character therein, upon the CapsNet predicting 'None' as an output, when only one character is present in the generated segments; and
performing, by the one or more hardware processors, one-to-one mapping of the identified text associated with each text patch to the one or more predefined zones of the corresponding machine, thereby providing a visual relation therebetween, by using the mapped one or more connectors and the coordinates of the corresponding text patch (216).

2. The processor implemented method of claim 1, wherein the step of eliminating the static part from the one or more templates comprises:
inversing the plurality of images in the input;
performing depth-wise averaging of the inversed plurality of images;
applying adaptive thresholding to the averaged image for extracting the static part from the one or more templates;
matching the extracted static part from the one or more templates with the input using a Normalized Cross Correlation method to obtain a correlation of each point in the static part from the one or more templates with the input;
determining location of the static part from the one or more templates based on a point exhibiting a maximum correlation; and
eliminating the static part from the one or more templates from the input based on the determined location thereof.

3. The processor implemented method of claim 1, wherein the step of processing the plurality of de-templated images comprises:
generating masks for the one or more dialogue clouds using the SegNet architecture, wherein the SegNet architecture is pre-trained on the dataset of the plurality of dialogue cloud images to distinguish three classes including a background class, a boundary class and a dialogue cloud class; and
subtracting the masks from the de-templated images to obtain the plurality of de-clouded images.

4. The processor implemented method of claim 1, wherein the step of detecting the one or more connectors in the plurality of de-clouded images comprises:
detecting the one or more arrows using the CNN that is pre-trained to distinguish two classes including an arrow class and a background class;
detecting the one or more lines by using the Hough Line Transform to detect the presence of the one or more lines;
merging the detected one or more lines having a same slope and a Euclidean distance therebetween being less than 50 px (pixels); and
filtering the one or more lines based on the mapping of the one or more connectors to the corresponding text patch.

5. The processor implemented method of claim 1, wherein the step of detecting coordinates of each text patch in each of the plurality of images in the input comprises:
localizing text lines using the CTPN to locate the bounding text boxes around each text patch; and
sampling 480×360 px windows in each of the plurality of images with an overlap.

6. The processor implemented method of claim 1, wherein the step of mapping each of the one or more connectors to a corresponding text patch comprises:
 associating each of the one or more connectors to one of the bounding boxes around each text patch by extrapolating tails of the one or more connectors; and
 clustering the text patches using the clustering method such that number of text patches equals the number of the one or more connectors.

7. The processor implemented method of claim 1, wherein the clustering method is either a (i) K-means clustering method, wherein K is the number of connectors associated with each of the bounding boxes or (ii) Mean-Shift Clustering method.

8. The processor implemented method of claim 1, wherein the step of performing one-to-one mapping of the identified text associated with each text patch to one of the one or more predefined zones comprises extrapolating the one or more connectors such that proximity of the text patch is indicative of a tail and proximity to a predefined zone is indicative of the arrow head.

9. A system (100) comprising:
 one or more data storage devices (102) operatively coupled to one or more hardware processors (104) and configured to store instructions configured for execution by the one or more hardware processors to:
  receive an input comprising a plurality of images, the plurality of images being characterized by identical one or more templates, wherein each template in the one or more templates comprises a static part being a line diagram representation of a machine having one or more predefined zones and a dynamic part comprising handwritten content associated with the one or more predefined zones of a corresponding machine;
  eliminate the static part from the one or more templates from each of the plurality of images to obtain a plurality of de-templated images comprising the dynamic part, wherein the handwritten content comprises one or more independent text patches and one or more dialogue clouds surrounding the independent text patches, associated with one or more connectors;
 process the plurality of de-templated images to eliminate the one or more dialogue clouds thereof to obtain a plurality of de-clouded images using an encoder-decoder based SegNet architecture for segmenting the one or more dialogue clouds, the de-clouded images comprising a plurality of text patches, wherein the SegNet architecture is pre-trained on a dataset of a plurality of dialogue cloud images;
 detect the one or more connectors in the plurality of de-clouded images by using a Convolutional Neural Network (CNN) classifier and a Hough Line Transform to detect at least one of one or more arrows and one or more lines respectively that constitute the one or more connectors;
 detect coordinates of each text patch in each of the plurality of images of the input using a Connectionist Text Proposal Network (CTPN), the coordinates forming bounding boxes around each text patch;
 map each of the one or more connectors to a corresponding text patch based on the coordinates associated thereof and by using a clustering method;
 identify text associated with each text patch, in American Standard Code for Information Interchange (ASCII) format, using the de-clouded image, a Capsule Network (CapsNet) and a Spatial Transformer Network (STN), wherein identifying the text associated with each text patch comprises:
  segmenting each text patch using a Connected Component Analyses (CCA) to generate segments having one or more characters therein;
  ranking the segmented characters in the generated segments that are unordered to obtain characters arranged in a human readable form;
  using the CapsNet to recognize the generated segments having more than one characters therein; and
  using the STN to recognize the generated segments having one character therein, upon the CapsNet predicting 'None' as an output, when only one character is present in the generated segments; and
 perform one-to-one mapping of the identified text associated with each text patch to the one or more predefined zones of the corresponding machine, thereby providing a visual relation therebetween, by using the mapped one or more connectors and the coordinates of the corresponding text patch.

10. The system of claim 9, wherein the one or more hardware processors are further configured to eliminate the static part from the one or more templates by:
 inversing the plurality of images in the input;
 performing depth-wise averaging of the inversed plurality of images;
 applying adaptive thresholding to the averaged image for extracting the static part from the one or more templates;
 matching the extracted static part from the one or more templates with the input using a Normalized Cross Correlation method to obtain a correlation of each point in the static part from the one or more templates with the input;
 determining location of the static part from the one or more templates based on a point exhibiting a maximum correlation; and
 eliminating the static part from the one or more templates from the input based on the determined location thereof.

11. The system of claim 9, wherein the one or more hardware processors are further configured to process the plurality of de-templated images by:
 generating masks for the one or more dialogue clouds using the SegNet architecture, wherein the SegNet architecture is pre-trained on the dataset of the plurality of dialogue cloud images to distinguish three classes including a background class, a boundary class and a dialogue cloud class; and
 subtracting the masks from the de-templated images to obtain the plurality of de-clouded images.

12. The system of claim 9, wherein the one or more hardware processors are further configured to detect the one or more connectors in the plurality of de-clouded images by:
 detecting the one or more arrows using the CNN that is pre-trained to distinguish two classes including an arrow class and a background class;
 detecting the one or more lines by using the Hough Line Transform to detect the presence of the one or more lines;
 merging the detected one or more lines having a same slope and a Euclidean distance therebetween being less than 50 px (pixels); and
 filtering the one or more lines based on the mapping of the one or more connectors to the corresponding text patch.

13. The system of claim 9, wherein the one or more hardware processors are further configured to detect coordinates of each text patch in each of the plurality of images in the input by:
  localizing text lines using the CTPN to locate the bounding text boxes around each text patch; and
  sampling 480×360 px windows in each of the plurality of images with an overlap.

14. The system of claim 9, wherein the one or more hardware processors are further configured to map each of the one or more connectors to a corresponding text patch by:
  associating each of the one or more connectors to one of the bounding boxes around each text patch by extrapolating tails of the one or more arrows; and
  clustering the text patches using the clustering method such that number of text patches equals the number of the one or more connectors.

15. The system of claim 9, wherein the clustering method is either a (i) K-means clustering method, wherein K is the number of connectors associated with each of the bounding boxes or (ii) Mean-Shift Clustering method.

16. The system of claim 9, wherein the one or more hardware processors are further configured to perform one-to-one mapping of the identified text associated with each text patch to one or more predefined zone by extrapolating the one or more connectors such that proximity of the text patch is indicative of a tail and proximity to a predefined zone is indicative of the arrow head.

17. A computer program product comprising a non-transitory computer readable medium having a computer readable program embodied therein, wherein the computer readable program, when executed on a computing device, causes the computing device to:
  receive an input comprising a plurality of images, the plurality of images being characterized by identical one or more templates, wherein each template in the one or more templates comprises a static part being a line diagram representation of a machine having one or more predefined zones and a dynamic part comprising handwritten content associated with the one or more predefined zones of a corresponding machine;
  eliminate the static part from the one or more templates from each of the plurality of images to obtain a plurality of de-templated images comprising the dynamic part, wherein the handwritten content comprises one or more independent text patches and one or more dialogue clouds surrounding the independent text patches, associated with one or more connectors;
  process the plurality of de-templated images to eliminate the one or more dialogue clouds thereof to obtain a plurality of de-clouded images using an encoder-decoder based SegNet architecture for segmenting the one or more dialogue clouds, the de-clouded images comprising a plurality of text patches, wherein the SegNet architecture is pre-trained on a dataset of a plurality of dialogue cloud images;
  detect the one or more connectors in the plurality of de-clouded images by using a Convolutional Neural Network (CNN) classifier and a Hough Line Transform to detect at least one of one or more arrows and one or more lines respectively that constitute the one or more connectors;
  detect coordinates of each text patch in each of the plurality of images of the input using a Connectionist Text Proposal Network (CTPN), the coordinates forming bounding boxes around each text patch;
  map each of the one or more connectors to a corresponding text patch based on the coordinates associated thereof and by using a clustering method;
  identify text associated with each text patch, in American Standard Code for Information Interchange (ASCII) format, using the de-clouded image, a Capsule Network (CapsNet) and a Spatial Transformer Network (STN), wherein identifying the text associated with each text patch comprises:
    segmenting each text patch using a Connected Component Analyses (CCA) to generate segments having one or more characters therein;
    ranking the segmented characters in the generated segments that are unordered to obtain characters arranged in a human readable form;
    using the CapsNet to recognize the generated segments having more than one characters therein; and
    using the STN to recognize the generated segments having one character therein, upon the CapsNet predicting 'None' as an output, when only one character is present in the generated segments; and
  perform one-to-one mapping of the identified text associated with each text patch to the one or more predefined zones of the corresponding machine, thereby providing a visual relation therebetween, by using the mapped one or more connectors and the coordinates of the corresponding text patch.

* * * * *